United States Patent [19]

Casaert et al.

[11] 4,182,738

[45] Jan. 8, 1980

[54] METHOD OF MANUFACTURING HELICAL MEMBERS FROM A SYNTHETIC EXTRUDED MATERIAL

[75] Inventors: René Casaert, Lille; Michel Pavy, Wattignies, both of France

[73] Assignee: Nortene, Lille, France

[21] Appl. No.: 759,659

[22] Filed: Jan. 17, 1977

[30] Foreign Application Priority Data

Jan. 19, 1976 [FR] France .................. 76 01241

[51] Int. Cl.² .............................................. D01D 5/12
[52] U.S. Cl. .................. 264/210.2; 264/281; 264/210.8; 425/319; 425/391
[58] Field of Search ............... 264/281, 210 R, 282, 264/286; 425/319, 322, 391, 133.5, 319

[56] References Cited

U.S. PATENT DOCUMENTS

| | | | |
|---|---|---|---|
| 1,824,482 | 9/1931 | Hartmann | 425/319 |
| 1,931,371 | 10/1933 | Bonnot | 264/281 |
| 2,039,475 | 5/1936 | Campbell | 264/281 |
| 2,313,630 | 3/1943 | Dockerty | 264/286 |
| 2,350,996 | 6/1944 | Atkinson et al. | 264/286 |
| 2,385,358 | 9/1945 | Hanson | 264/DIG. 47 |
| 2,462,808 | 2/1949 | Danner | 425/322 |
| 2,573,300 | 10/1951 | Beaumariage et al. | 425/322 |
| 2,575,747 | 11/1951 | Cook | 264/281 |
| 2,601,269 | 6/1952 | Fisch | 264/281 |
| 2,994,104 | 8/1961 | Mittag | 264/281 |
| 3,284,851 | 11/1966 | Zernay | 425/319 |
| 3,454,695 | 7/1969 | Holmgren | 264/281 |
| 3,728,189 | 4/1973 | Hannes et al. | 264/281 |

FOREIGN PATENT DOCUMENTS 473972 of 1953 Italy ........................... 264/146

*Primary Examiner*—Jay H. Woo
*Attorney, Agent, or Firm*—Brisebois & Kruger

[57] ABSTRACT

Method of manufacturing helical members from a synthetic plastic material comprises the step of leading the extruded material while still deformable along the helical path and permitting it to harden while retained in that path. The invention also comprises a machine for carrying out this process and the article produced thereby.

4 Claims, 7 Drawing Figures

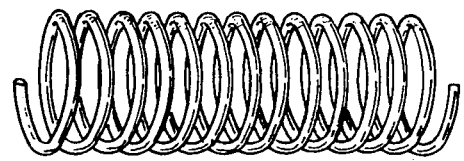
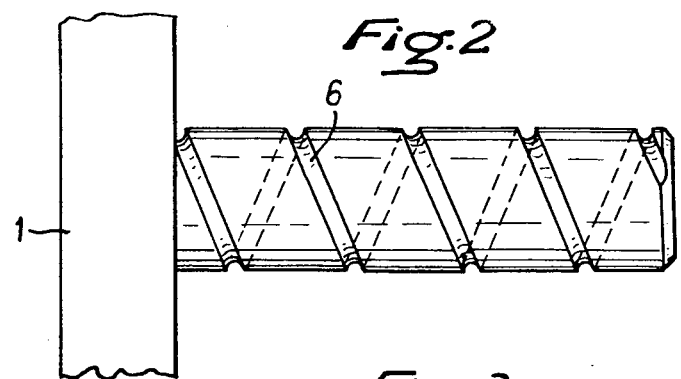
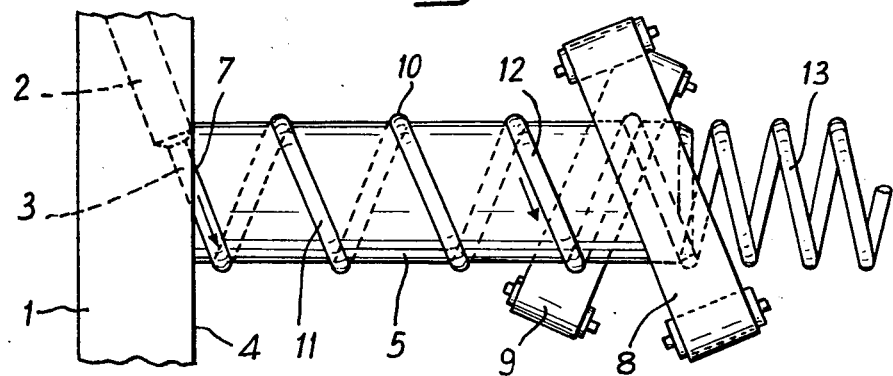
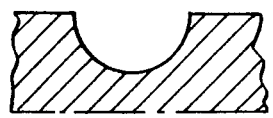  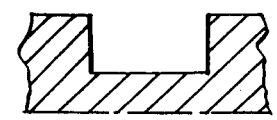

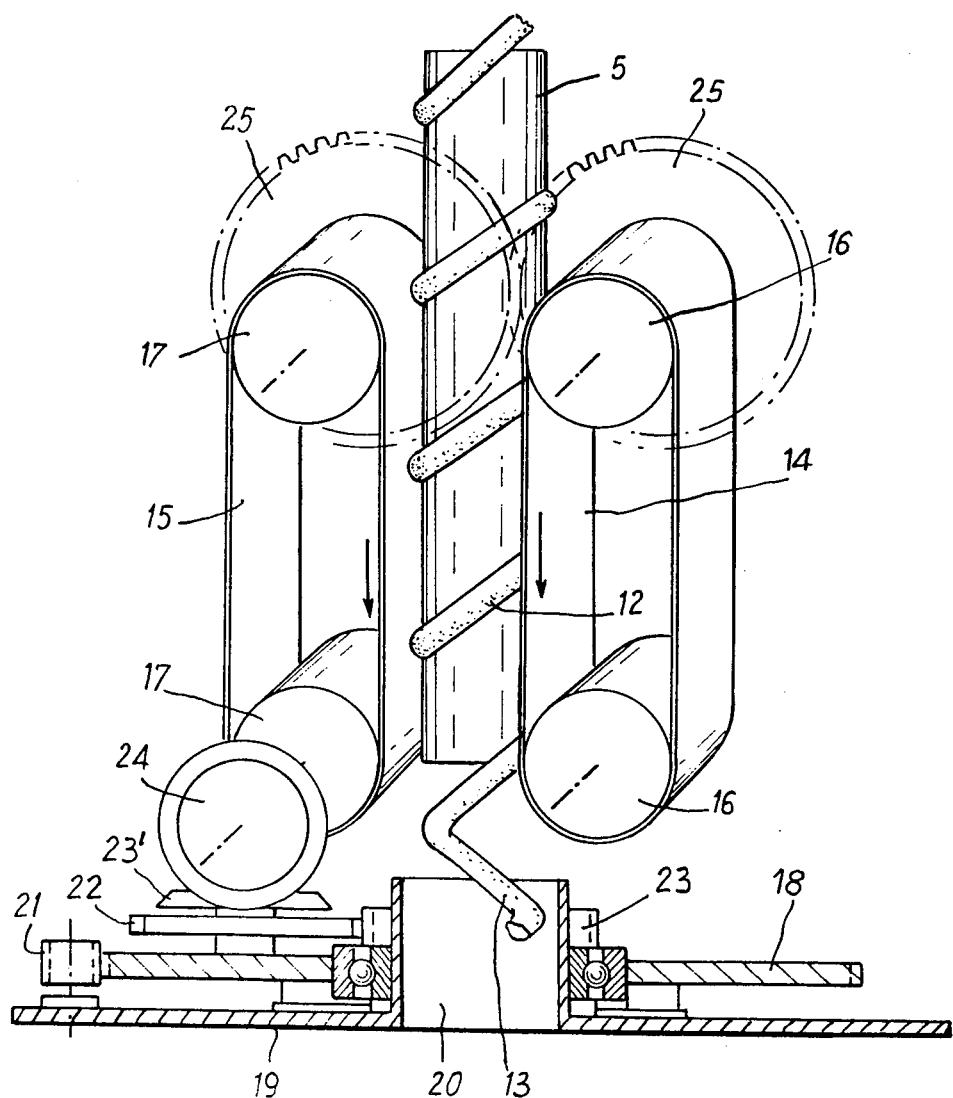

METHOD OF MANUFACTURING HELICAL MEMBERS FROM A SYNTHETIC EXTRUDED MATERIAL

SUMMARY OF THE INVENTION

This invention relates to a method of manufacturing helical members of a synthetic material, especially an extruded plastic.

The invention also relates to a device for carrying out this process as well as to the helical members produced thereby.

It is desirable for many applications to have available members of plastic material in the form of an elongated member such as a wire or filament extending along a helical line. Such members may be used, for example, as helical springs of plastic material, as liners for the inside of a tube, or for many other applications.

It has not, however, been possible up to the present time to practically manufacture such members in a simple manner.

The invention proposes to fill this need and provide a process of making helical members of synthetic material which is simple, easy and economical to carry out, and makes it possible to obtain members having reproducible and reliable properties.

The invention also proposes to provide a device for carrying out this process which permits continuous operation at a low investment.

Finally, the invention proposes to provide such helical members in which the pitch, diameter and different dimensional characteristics may vary over a wide range from members of very small dimensions to members of large dimensions, said members having excellent qualities from the point of view of geometric constancy and mechanical properties.

It is an object of the present invention to provide a process of manufacturing helical members of synthetic material, especially plastic, characterized by the fact that an elongated synthetic material is extruded, that after the extrusion this member is forced, while still deformable, especially in the plastic state, to follow a helical path, that said member is cooled or permitted to cool on this path until it becomes rigid, and that a traction is exerted at at least one point on the rigid part which is oriented substantially in the direction of travel of the member at that point.

Preferably the extrusion of the member takes place in a direction substantially tangential to the point of entry of the extruded member into the helical path, the end of the extruding device leading directly to this initial part of the path.

Advantageously the traction exerted in the direction of the helical path on the member therein is produced by mechanical means but other means may be used and especially the flow of a fluid, especially water tending to draw the member along with it, said fluid serving, for example, also to cool the member so that, in this case, one may envisage that at least part of the traction is exerted on a part of the member which is still not completely rigid.

It is a further object of the invention to provide a device for carrying out this process characterized by the fact that it comprises an extrusion die for extruding an elongated member, a duct or groove, defining a helical path which the member is required to follow from the output of the drawing device, and traction or driving means for the member, said means cooperating with at least part of said path to exert a traction in the direction of the path of travel. Advantageously the device may comprise a cylindrical member having a duct or groove at its surface which has a helical shape. This member may consist, for example, of a tube or cylindrical bar in the surface of which a helical groove is formed, the section of which groove is substantially complementary to at least part of the transverse section of the member.

The traction means may advantageously comprise one or more endless strips or belts, one lap of which is inclined with respect to the axis of the helical path of travel taken over a certain length of this path, the direction of the strip or belt being substantially aligned with the median tangent along this part of the path of travel. Alternatively, one may also use one or more strips or endless belts parallel to the axis of the helical path of travel and preferably in contact with several turns at the same time, said belts being mounted on a frame adapted to rotate about the cylindrical member at a speed synchronized with the extraction speed so that the resulting speed of the belt in contact with the turn of the member is substantially equal to the speed of advance of the member in its helical groove so that there is no sliding or substantial friction.

Other traction means may be used instead and one may thus use rollers which are suitably inclined with respect to the axis of the helical path and preferably coated with a flexible material, for example, a lining of rubber. Alternatively, one may use inclined hollow driving rollers and having, for example, an internal coating of rubber and an internal diameter such that the cylindrical member passes through the inclined roller with a relatively small clearance.

The device may comprise means for cooling, especially by spraying water, but it is also possible, in at least certain applications, to let the member cool along its helical path of travel by natural cooling.

The invention also relates to the helical members obtained by this process.

The transverse section of the helically deformed member may be of any desired dimensions.

It may have, for example, a transverse circular section, a flattened circular, rectangular or square section. However, more complex shapes may be used, such as polygonal, star-shaped, multi-lobed, S, C and U sections or any other shape corresponding to that of the extrusion nozzle.

The products according to the invention may be made in any extrudable material and especially thermoplastic materials such as polyethylene, polypropylene, polyesters and polystyrenes.

Other advantages and characteristics of the invention will appear from a reading of the following description, given purely by way of example, with reference to the accompanying drawings, in which:

FIG. 1 is a perspective view of a helical member according to the invention;

FIG. 2 is a detail view of a device for carrying out the process according to the invention;

FIG. 3 is a side view of a similar device with its traction means;

FIGS. 4, 5 and 6 are sectional views showing the possible shapes of the helical groove for carrying out the invention; and FIG. 7 is a detail view of a device according to another embodiment of the invention.

Referring first to FIGS. 2 and 3, the device according to the invention comprises at the front of an extruder of any type, a metallic plate 1 provided with a passage 2 the rear end of which, not shown, leads to a duct for supplying plastic material to be extruded and the front part of which is followed by a short duct 3 opening obliquely to the front face 4 of the plate 1 and forming the extrusion nozzle proper.

Perpendicularly to the plate 1 is mounted a thick cylindrical metallic rod 5 in the outer surface of which a helical groove 6 is formed. The transverse section of this groove is semi-circular. FIG. 3 shows that the rod 5 is so positioned that the beginning 7 of the groove 6 is at the outlet of the extrusion duct or nozzle 3.

Preferably the geometric axis of the rod is vertical.

FIG. 3 shows that the device comprises two endless belts 8 and 9 carried by suitable rollers and driven by motors (not shown), each of the belts being obliquely applied to the external surface of the member 5 along a helical part of the groove 6. Of course the belts may be larger than shown and act on several turns at one time.

In order to carry out the process, an elongated filament having a circular section is extruded by the nozzle 3. When a sufficient length of this filament has been extruded, this extruded length is wound about the member 5 by causing it to lie in the groove 6 as shown in FIG. 3. The belts 8 and 9 are then put in place. These are then actuated and exert a tangential traction on the parts of the members which they cover. The speed of the belts is of course regulated so as to exert on the wound member a helical traction compatible with the speed of extrusion.

As the extrusion proceeds the extruded filament 10, drawn by the belts 8 and 9, is led into the helical groove 6. The first turns of the filament, such as the turn 11, are still in a deformable or plastic state and they cool little by little in the helical shape, eventually becoming rigid in the zone 12 in which they are taken in charge by the belts 8, 9. Preferably, the turns are simultaneously cooled, for example, by the projection of water. At the end of the rod 5 the member according to the invention is released, and it will be seen that it has rigid helical turns 13. FIG. 1 shows such a member in the form of a helix having a circular transverse section.

Of course any suitable transverse section could be imparted to the nozzle and groove 6 in FIG. 4 shows a semicircular section corresponding to the neck of FIG. 2, while FIG. 5 shows a flattened circular section, and FIG. 6 shows a rectangular groove section.

Referring now to FIG. 7, this shows another embodiment of the invention in which two endless belts 14, 15 travel around corresponding rollers so as to follow a vertical path extending in the direction of the arrows for the laps of the belts, positioned on opposite sides of the member 5, which are in contact with the solidified turns 12.

The supporting rollers 16, 17 of these belts are mounted on a device which rotates about the vertical geometric axis of the member 5. This device, not shown, may be, for example, supported by a plate 18 mounted to rotate about a stationary base 19, having a central passage 20 for the passage of the member 13. Plate 18 is driven in rotation by external teeth which cooperate with a driving pinion 21. This plate 18 carries, on the other hand, a pinion 22 engaging with stationary teeth 23 fixed to the stationary base 19 and it will be appreciated that the rotation of the plate 18 consequently provokes rotation of the pinion 22 about its axis. Pinion 22 is fixed to a conical pinion 23 engaging another conical pinion 24 mounted on the shaft of the lower roller 17.

It will thus be understood that rotation of the plate 18 by driving pinion 21 causes rotation of the pinion 24 and consequently of the roller 17 which drives the belt 15 and consequently the upper roller 17 which, for example, through the two gear wheels 25, causes rotation of the belt 14 in the opposite direction.

The speed of rotation of the plate 18 is controlled so that the belts turn about the member 5 at the same speed as the turn 12 and travel vertically at the axial speed of displacement of these turns, so that there is no sliding of the belts with respect to the turns 12 of plastic material.

This makes it possible to provide perfect drive without exerting an undesirable strain on the turns 12 of the member 13.

While the invention has been described with respect to a particular embodiment, it will of course be appreciated that it is not limited to this specific embodiment, which may be modified as to detail without thereby departing from the basic principles of the invention.

What is claimed is:

1. Method of manufacturing helical members of synthetic material, which method comprises the steps of,
    extruding an elongate member from synthetic material directly onto a fixed cylindrical element,
    causing said member while still deformable in the plastic state to follow a helical path of travel around the fixed cylindrical element, the direction of extrusion being substantially tangential to the point at which said extruded member enters said helical path,
    permitting said member to cool as it travels along said path until it becomes rigid,
    and exerting on at least one point on the helical rigid portion of said member, a tractive force oriented substantially in the direction in which said member is travelling at that point.

2. Method as claimed in claim 1 in which the traction exerted in the direction of the helical path on the member is produced by mechanical means.

3. Method as claimed in claim 1 in which the traction exerted on the member is produced by the flow of a fluid which tends to draw said member along with it.

4. Process as claimed in claim 3 in which at least part of the traction is exerted on a part of the member which is not yet completely rigid.

* * * * *